June 12, 1928.
J. STRAND
1,673,128
WALL BOARD LATH
Filed Sept. 24, 1924
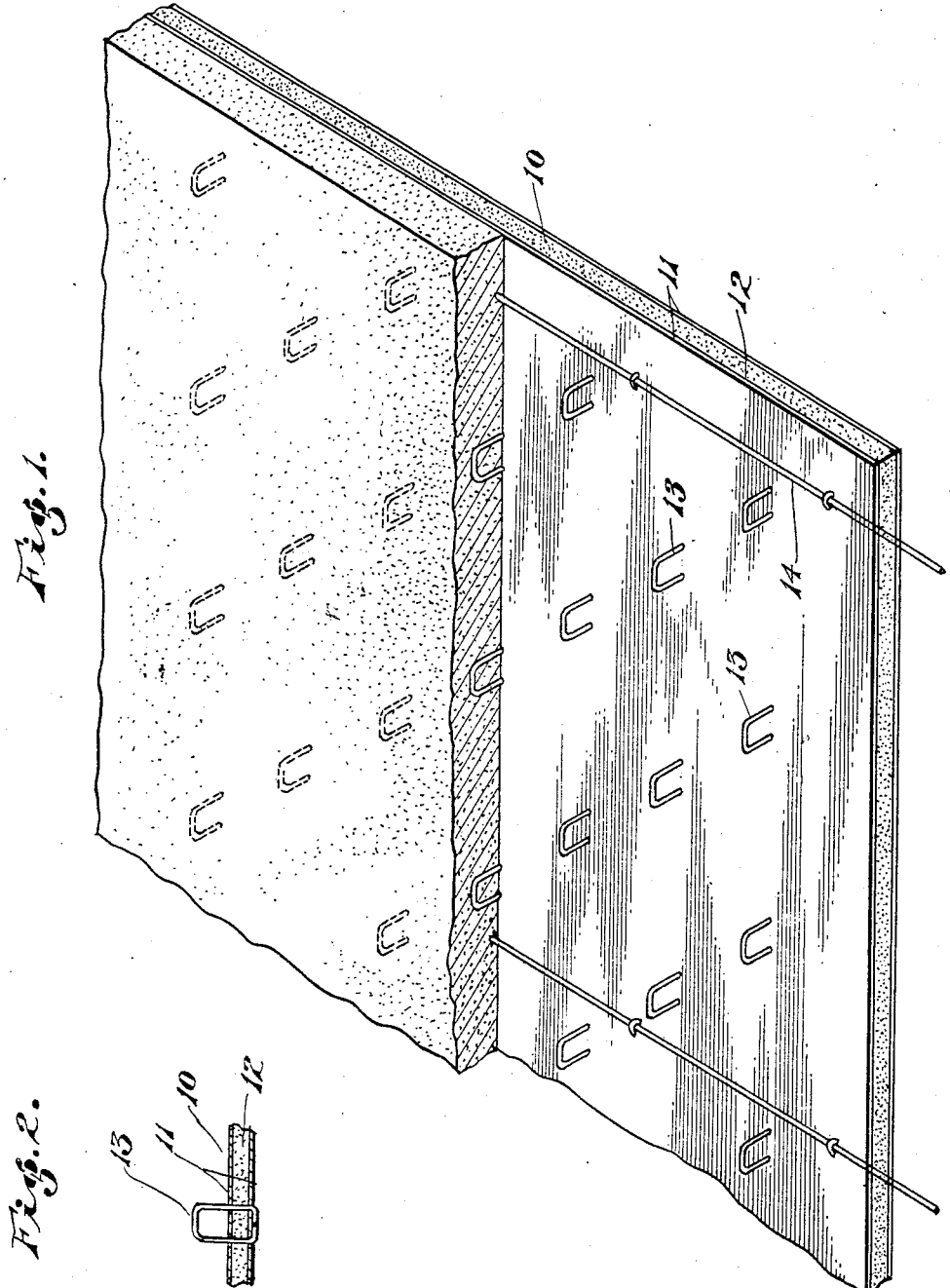
INVENTOR
JOSEPH STRAND
BY Dewey, Strong, Townsend & Loftus
ATTY'S.

Patented June 12, 1928.

1,673,128

UNITED STATES PATENT OFFICE.

JOSEPH STRAND, OF LOS ANGELES, CALIFORNIA.

WALL-BOARD LATH.

Application filed September 24, 1924. Serial No. 739,557.

This invention relates to building construction, and particularly pertains to wall boards.

At the present time it is common practice in the construction of certain building structures to eliminate the use of lath for a plaster support in the walls and ceilings of the building and to substitute a continuous plaster supporting surface such as composition boards made of plaster and paper, paper and thin veneer boards, and others made of various compositions. Many of these structures are especially formed to produce a suitable bond between the back wall and the plaster which is spread under this surface. These structures have not proved adequate, however, and in some instances are very expensive. It is the principal object of the present invention, therefore, to provide a wall board which may be simply and economically made, and which will provide a desirable supporting and bonding surface for plaster and other plastic compositions which may be applied thereto, being applicable for both interior and exterior work.

The present invention contemplates the use of a board formed of plastic material disposed between sheets of straw board, said laminated structure being then provided with rows of projecting bonding members which are spaced equidistant along the rows and arranged in staggered relation to each other in the successive rows.

The invention is illustrated by way of example in the accompanying drawings, in which.

Fig. 1 is a view in perspective showing a fragmentary portion of the wall board with a plastic coating applied thereto.

Fig. 2 is an enlarged fragmentary view in section showing the construction of the bonding members.

Referring more particularly to the drawings, 10 indicates a wall board adapted to be used for providing a plaster supporting surface for exterior and interior walls and ceilings. As here shown, the board comprises sheets of straw board or paper as indicated at 11, between which a layer of plastic material 12 is disposed. The plastic composition may be of any preferred ingredients, although in the present instance it comprises plaster, sand and fibrous material, such as sawdust. These boards may be cut to required dimensions and secured to the studding of a building structure. The opposite surfaces of the boards are plane, and in order to securely bond plastic material to one of these surfaces it is necessary to provide obtrusions or protrusions in or from this surface. For this purpose bonding members 13 are provided. These members are in reality staples which are driven through the board and clenched as indicated in Fig. 2, the loop portion of each staple projecting a fixed distance from the plaster receiving surface of the board. These staples may be made of light gage wire and may be conveniently applied by automatic stapling machines which form the staple from a reel of wire, cut them, and drive them through the board, while arranging them in rows and in spaced relation to each other. It is preferable that the length of a projecting staple shall be substantially equal to the depth of the body coat of plaster which is applied to the board. This will act as a guide for the depth of the plaster to be applied. It may be desirable to provide means for tying the wall boards together and for this purpose wires may be secured beneath the staples as indicated at 14. These wires will also serve to provide additional bonding means.

In practice the plaster boards may be of any material desired, after which the rows of staples may be applied. These staples are driven through the board and clenched, and are all caused to project a fixed uniform distance from one surface of the board. The loops of the staples all extend in parallel planes, thus presenting surfaces which will tend to uphold the plaster as it is being applied. This is particularly true when the loops all lie in horizontal planes. As the plaster is applied to the board the staples will afford a ready gage for the plaster so that when the plaster has been applied equal to the depth of the staples the plasterer may then allow this coat to dry, and then apply a finished coat if desired.

It will thus be seen that the wall board here disclosed, while simple in its construction and formation, will provide a suitable backing and support for plastic material and a desirable bond which may be incorporated in the structure of the board at a small expense, and when bond will be serviceable when the board is used exteriorly or interiorly.

While I have shown the preferred form of my invention as now known to me, it will be understood that various changes may be made in the combination, construction and arrangement of parts by those skilled in the art, without departing from the spirit of the invention as claimed.

Having thus described my invention, what I claim and desire to secure by Letters Patent is:

1. A wall board adapted to receive a plaster facing, and having rows of staples driven through said board and clenched, the loop portions of said staples projecting a considerable uniform distance from one plane surface of the board to provide bonding means for a facing and being arranged with their loops in parallel planes.

2. A wall board adapted to receive a plaster facing and staples driven through the board and clenched, the loop portions of the staples being unobstructed and projecting a considerable uniform distance from one plane surface of the board to provide bonding means for a facing.

JOSEPH STRAND.